Figure 1:
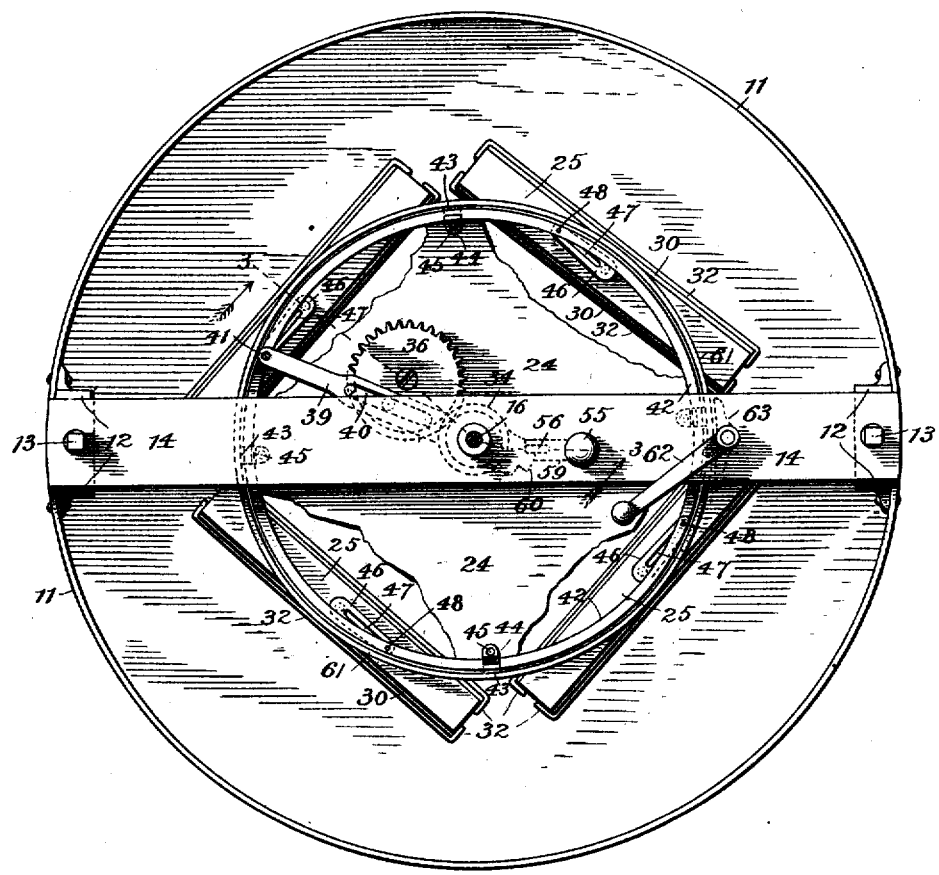

J. F. KROPP.
HONEY EXTRACTOR.
APPLICATION FILED NOV. 21, 1905.

914,290.

Patented Mar. 2, 1909.
4 SHEETS—SHEET 1.

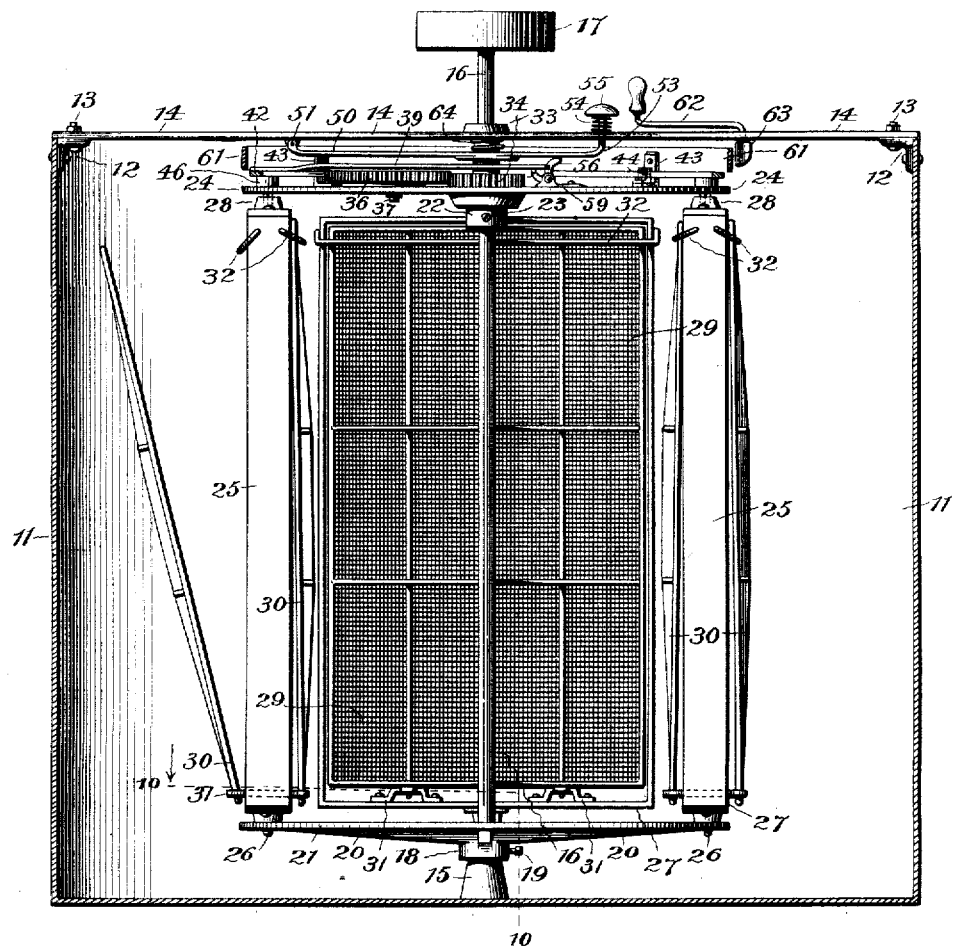

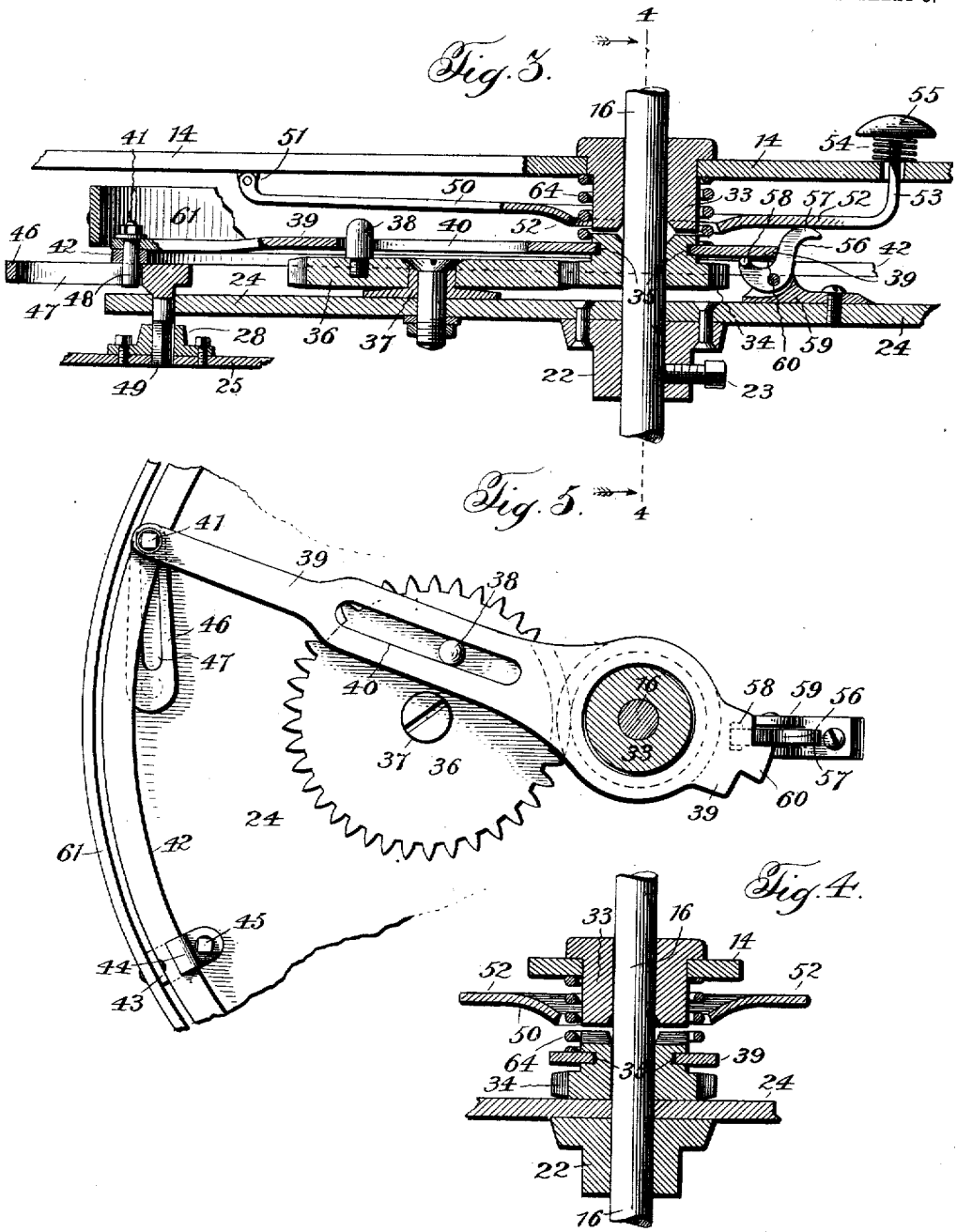

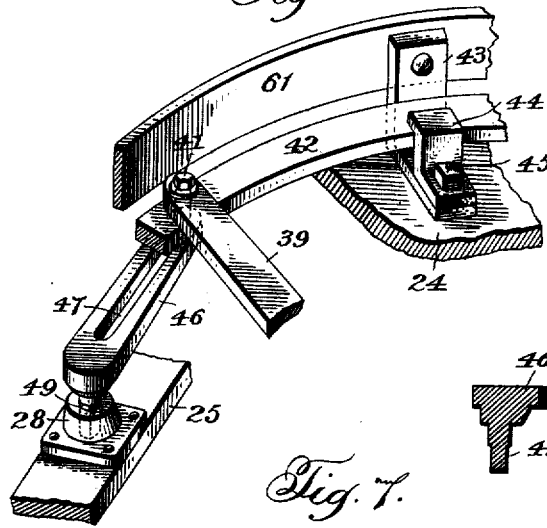
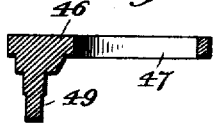
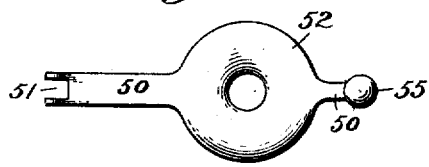
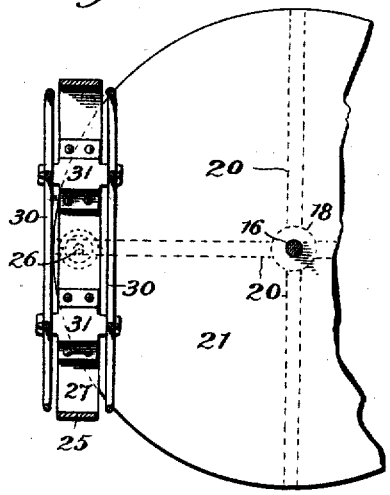

UNITED STATES PATENT OFFICE.

JACOB F. KROPP, OF ATTICA, NEW YORK.

HONEY-EXTRACTOR.

No. 914,290.　　　　Specification of Letters Patent.　　　Patented March 2, 1909.

Application filed November 21, 1905. Serial No. 288,436.

*To all whom it may concern:*

Be it known that I, JACOB F. KROPP, a citizen of the United States, residing at Attica, in the county of Wyoming and State of New York, have invented certain new and useful Improvements in Honey-Extractors, of which the following is a specification, reference being had therein to the accompanying drawing.

This invention relates particularly to centrifugal honey-extractors, wherein the honeycombs are placed in baskets which are revoluble within a casing, the honey being thrown out from the combs without injury thereto as the baskets are revolved, and following are some of the advantages which may be possessed by an extractor in which this invention is embodied: Efficient and effective means are provided whereby all the comb-baskets can be simultaneously reversed without stopping their revolution after the honey is thrown out from one side thereof, so that a similar operation can be effected from the other side. The reversing mechanism is so arranged that the reversing operation can be effected any number of times without reversing the direction of rotation of the driving means or of revolution of the comb-baskets. Simple means are included in the invention whereby the reversing mechanism and thereby the comb-baskets are securely and automatically secured and held in place upon completion of the reversing operation. When the reversing mechanism is started, the same is automatically held in operative position during reversal of the comb-baskets and automatically stopped upon completion of the reversal movement. The mechanism constituting the reversing means is placed near the top of the machine and above the comb-baskets, whereby it is easily accessible, and where it is not likely to become clogged by the material treated by the machine. The comb-baskets are pivoted to their carrying-frame on the line of their longitudinal centers. This results, when the baskets are reversed, in a swing in a circumference of less diameter than in machines wherein the baskets are hung at the side, and thus larger baskets can be used on a frame commonly necessary for the accommodation of side-hung baskets. Further, the reversing mechanism is such that the speed of rotation of the comb-baskets in reversing is slow at first, increases gradually to the middle, and then gradually decreases to the end, thereby avoiding sudden jars which would tend to break the combs. In addition, the baskets being centrally hung and therefore turning in a comparatively small circumference, liability of slamming against other parts of the machine and the resulting sudden jars are further obviated. Centrally-hung baskets, being balanced in themselves, offer no undue resistance to other parts of the machine to prevent their swinging into undesired positions. The comb-baskets are constructed so that access to the interior for insertion and removal of the combs is easily had; so that the baskets can be readily removed from and replaced in the machine; and so that they are securely held in proper place and position while the machine is in operation. Effective and simple means which require no adjustment are provided whereby speed of revolution of the comb-baskets is readily controlled. A circular plate is provided at the top of the comb-basket carrying-frame, the plate strengthening the frame, simplifying its construction, and forming a convenient place of attachment for other elements of the device. Further, this plate retards suction of air into the casing when the machine is in motion.

The invention provides a device in which the parts are so formed that the machine is capable of withstanding hard usage, and the construction of the machine is such that the operative parts can with ease be removed bodily from the casing.

The details of construction and arrangement of parts contemplated by this invention are disclosed in the accompanying drawings, forming part hereof, wherein a preferable embodiment of the invention is shown, for purposes of illustration, and in which like reference characters refer to corresponding parts in the several views, whereof—

Figure 1 is a top plan view of a honey-extractor in which this invention is included; Fig. 2 is a side elevation, the casing being shown in section, and one of the comb-baskets being omitted for better disclosure of the structure; Fig. 3 is an enlarged sectional view of the reversing mechanism, taken on the line 3—3, and looking in direction of arrows, Fig. 1, the mechanism being shown as when the comb-baskets are one-half reversed; Fig. 4 is a sectional view, taken on the line 4—4, and looking in direction of arrows, Fig. 3, the mechanism being shown as when at rest; Fig. 5 is an enlarged top view showing a portion of the reversing mechanism at rest and in locked position; Fig. 6 is an enlarged detail view showing the brake-band, the reversing-ring, a reversing-crank, and a portion of a comb-basket; Fig. 7 is a top view of the hand-latch; Fig. 8 is a sectional view of a reversing-crank; Fig. 9 is a top view of one of the comb-baskets; and Fig. 10 is a view, on the line 10—10, and looking in direction of arrows, Fig. 2, showing the bottom construction of the comb-basket carrying-frame, and the means of securing the comb-basket frames at the bottom.

The honey-extractor includes a preferably-cylindrical casing 11, open at the top. Brackets 12 are attached to the casing at opposite sides thereof, and to these brackets is secured by bolts 13 a cross-bar 14. A step-bearing 15 is centrally supported upon the bottom of the casing. A shaft 16 is journaled in bearing 15 and in cross-bar 14, extends a suitable distance above the machine, and has attached thereto any suitable driving element 17. A collar 18 is secured by set-screw 19 to shaft 16 near its bottom, and any desired number of arms 20 extend radially therefrom and support a circular plate 21 which has shaft 16 as its center. A collar 22, securely held on shaft 16 by a set-screw 23, supports a circular plate 24, having the shaft as its center. This construction constitutes the rotatable carrying-frame for the comb-baskets or receptacles 25. Comb-baskets or receptacles 25 are pivotally supported by plates 21 and 24, pivots 26 being attached centrally to the bottom of the basket-frames 27 and seating in journals in plate 21, and a member 28 being attached centrally to the top of the basket-frame for the reception of means passed through plate 24 for rotating the baskets. The sides of comb-baskets 25 each comprises a frame supporting wire cloth or netting 29. Upright members 30 of the frame seat in apertured steps 31 attached to the bottom portion of frame 27. This construction permits each side of a basket to be swung outwardly, or entirely removed if desired, to gain ready access to the interior of the basket. A latch 32 is pivotally secured on each side of each basket at the top, the latch being arranged to drop down over its complementary side frame and to hold the same securely closed.

A clutch-member 33 is securely and non-rotatably held in and extends below cross-bar 14 and forms a journal for shaft 16. Loosely hung on shaft 16, above plate 24 and adjacent to clutch-member 33, is a pinion 34, longitudinally movable on said shaft, formed with an annular groove 35, and having a clutch-face for engagement with clutch-member 33. A gear 36 is journaled on a bearing 37 which is attached to plate 24 and holds said gear slightly removed from said plate. Gear 36 meshes with pinion 34. Normally pinion 34 rotates with plate 24 and rests thereon with its bottom surface slightly below the bottom surface of gear 36, but with its teeth in mesh with said gear, so that when the pinion is raised on shaft 16 to engage clutch-member 33, as hereinafter explained, said pinion is in substantially the same plane as gear 36.

A pin 38 projects from the upper face of gear 36. An arm 39 is pivotally hung in annular groove 35 of pinion 34, has a longitudinal slot 40 therein in which pin 38 is operable and projects outwardly toward the edge of plate 24, and is connected at its free end by a pin 41 to a ring 42. Ring 42 is supported near the edge of plate 24 by brackets 43 attached to the plate and held down in place by lugs 44 which overlap said ring and are attached to brackets 43. Bolts 45 pass through the plate, brackets, and lugs, whereby the brackets and lugs are securely held together and in place on the plate.

For each of the comb-baskets 25, and journaled in plate 24 below ring 42, is a reversing-crank 46 having therein a longitudinal slot 47 which is traversable by a pin 48 depending from said ring. Pin 41 and one of pins 48 may be made integral, if desired, as shown in Fig. 6. The angular end 49 of crank 46 depends below plate 24 and seats in a correspondingly-angular recess in member 28 on top of comb-basket 25.

A hand-latch 50 is pivoted at one end to the under surface of cross-bar 14 by a hanger 51, includes an annular portion 52 surrounding shaft 16, and has an arm 53 extending upwardly from its free end through said cross-bar, where it is of easy access. A spring 54 is disposed between head 55 of arm 53 and cross-bar 14 to normally hold the hand-latch in upward position.

Attached to plate 24 is a trip-latch 56, having an upwardly projecting arm 57 engageable at all points of its revolution by annular portion 52 of hand-latch 50, and a curved arm 58 with its end engaging the inner end of arm 39. The trip-latch is pivoted between these two arms on a bracket 59. Arm 39 has a lug 60 projecting from its inner end. One side or the other of this lug engages one side or the other of arms 58 of trip-latch 56, as the case may be, when said arm 39 and latch are in their normal or at rest positions. The said arm, and thus the reversing mechanism, is thus locked at rest by said trip-latch.

The machine being in operation, the reversing movement is started by downward manual pressure on head 55 of hand-latch 50, which results in downward movement of annular portion 52 against the end of upwardly-projecting arm 57 of trip-latch 56, whereby pivotal movement is imparted to the latch, arm 57 being depressed and moved outwardly from its lateral engagement with lug 60, and arm 58 of the latch being raised. The upward movement of arm 58 with its end in engagement with arm 39 serves to raise the inner end of the latter arm, there being sufficient spring in arm 39 and looseness in its pivotal connection with pin 41 at the other end to permit this movement without disturbing that connection. The upward movement of arm 39, which is pivotally hung in annular groove 35 of pinion 34, results in an upward movement of the pinion, and this movement is continued until the clutch-face of the pinion engages the clutch-face of member 33. Pinion 34 normally rotates with shaft 16 upon which it is mounted, member 33 is non-rotatably fixed in cross-bar 14, and the pinion and member are held normally separated by spring 64. Upon engagement of pinion 34 with member 33, its rotation will be stopped. Gear 36 in mesh with pinion 34 will continue to move with plate 24 upon which it is rotatably mounted, and it will be rotated as it revolves around pinion 34 during the time rotative movement of the pinion is stopped. Rotation of gear 36 serves to swing arm 39 through the instrumentality of pin 38 on the gear which operates in slot 40 of the arm. Arm 57 of trip-latch 56 and lug 60 are so arranged and proportioned that the arm becomes laterally disengaged from the lug at the time the clutches are engaged and swinging movement imparted to arm 39 as a result thereof, whereby arm 39 at the proper time is released from its lock and the swinging movement permitted. Immediately upon swinging or lateral movement of arm 39, the end of its lug 60 will contact with the upwardly-projecting arm 57 of trip-latch 56, and during the reversal movement hold said latch in the position it has been placed by pressure on hand-latch 50, and thereby hold arm 39 in its raised position without a continuance of pressure on the hand-latch. The end face of lug 60 is just sufficiently long to thus hold trip-latch 56 during the capable movement of arm 39 from end to end of its arc as determined by the circle of movement of pin 38. When the arm has swung from one end of its capable swinging movement to the other, the end of lug 60 will have passed arm 57 of the trip-latch, and by action of spring 64 the pinion will be separated from the fixed clutch-member, arm 39 will move downwardly, and arm 57 of the trip-latch will resume its lateral engagement with lug 60 and thereby lock the reversing mechanism against further movement. It is obvious that the reversing mechanism, by the means described, is held in locked position against unintentional reversal of the baskets, whether direction of their revolution is in one direction or the other. It will thus be seen that it is necessary to operate hand-latch 50 only long enough to start reversal, when pressure may be released, and the mechanism will continue in operation until reversal is completed.

A brake-band 61 is attached to plate 24 by the brackets 43 on the upwardly-projecting portions of which it is held. A crank 62 is hung in cross-bar 14 and has a shoe 63 attached thereto which is capable of engagement with brake-band 61.

A coil-spring 64 is disposed around clutch-member 33 and between cross-bar 14 and arm 39, whereby clutch-member 33 and pinion 34 are normally held apart.

The operative parts of the machine can be lifted bodily therefrom by detachment of cross-bar 14, whereupon the mechanism is free for removal without further release of attached parts. Comb-baskets 25 can be easily removed from the carrying-frame by loosening bolts 45 and turning lugs 44 which will release ring 42, and in turn permit the withdrawal of the end 49 of crank 46 from the recess in member 28, whereupon a basket is free to be lifted out from its lower bearing.

The honey-combs having been placed in the comb-baskets, the same are revolved by rotation of shaft 16, and all or a portion of the honey is thrown out from one side of the combs and gathered in the bottom of casing 11. The baskets are then reversed in the following manner: Speed of the machine is reduced by application of shoe 63 to brake-band 61. Pressure is applied to hand-latch 50 for a moment, which will operate trip-latch 56, release the same from the side of lug 60 and thereby release arm 39 for movement, and raise the inner end of arm 39 and pinion 34 until the clutch-face of said pinion engages clutch-member 33. Pressure on hand-latch 50 is then released, and the clutch-member and pinion will be held in operative contact by engagement of trip-latch 56 with the end of lug 60 as described. When pressure is applied to hand-latch 50, the shoe is released from the brake-band. Upon engagement of the clutch, pinion 34 will cease its rotation with shaft 16, and gear 36 will be rotated as it revolves around pinion 34. Rotation of gear 36, through the agency of pin 38 in slot 40, will swing arm 39 and move ring 42, which will operate reversing-cranks 46 through the instrumentality of pins 41 and 48 and result in rotation of comb-baskets 25 until the former inside faces are outside. Then trip-latch 56 will be released from contact with the end of lug 60, which will permit pinion 34 and arm 39 operated upon by spring 64 to return to normal position and at the same time release the clutch, terminate operation of the reversing mechanism, and move trip-latch 56 beside lug 60 to lock the reversing mechanism. It is obvious that the construction is such that the speed of rotation of the comb-baskets in reversing is gradually increased to the middle of the operation and gradually decreased therefrom to the end, as pin 48 in ring 42 is nearer the center of revolution of crank 46 at the middle of reversal movement than at other times. Further, it is apparent that the reversing mechanism is as well operable when the direction of revolution of the comb-baskets is one way as in the other. When the reversing operation is finished, the machine is allowed to regain its normal speed by release from resistance of the reversing mechanism, when the remainder, or any other desired quantity, of the honey is thrown out of the comb-baskets. The reversal operation may be repeated any number of times without stopping the machine.

Having thus described my invention, what I claim as new, and desire to secure by Letters Patent, is—

1. In a centrifugal machine, the combination with a pivotally-mounted receptacle, of means whereby said receptacle is reversed comprising a slotted crank connected with said receptacle, an arm adjacent to said crank and having a slot therein, a pin connected to said arm and operable in said crank-slot, a gear adjacent to said arm, a pin on said gear and operable in said arm-slot whereby said crank is moved, and means coöperating to rotate said gear.

2. In a centrifugal machine, the combination with a pivotally-mounted receptacle, of means operable to reverse said receptacle, comprising a slotted crank connected with said receptacle, an arm adjacent to said crank and having a slot therein, a pin connected with said arm and operable in said crank-slot, a gear adjacent to said arm, a pin on said gear and operable in said arm-slot to move said crank, means operable to rotate said gear, and means coöperable with said arm to control the movement thereof.

3. In a centrifugal machine, the combination with a pivotally-mounted receptacle, of means operable to reverse said receptacle, comprising a slotted crank connected with said receptacle, an arm adjacent to said crank and having a slot therein, a pin connected with said arm and operable in the crank-slot, a gear adjacent to said arm, a pin on said gear and operable in the arm-slot to move said crank, means operable to rotate said gear, a lug on said arm, and means coöperable with said lug to control the movement of said arm.

4. In a centrifugal machine, the combination with a pivotally-mounted receptacle, of means operable to reverse said receptacle, comprising a slotted crank connected with said receptacle, an arm adjacent to said crank and having a slot therein, a pin connected with said arm and operable in the crank-slot, a gear adjacent to said arm, a pin on said gear and operable in the arm-slot to move said crank, means operable to rotate said gear, a lug on said arm, and a pivoted latch coöperable with said lug to control the movement of said arm.

5. In a centrifugal machine, the combination with a rotatable support and a receptacle pivotally mounted thereon, of an arm operable to reverse said receptacle, and a pivoted latch coöperable with said arm to control the movement thereof.

6. In a centrifugal machine, the combination with a rotatable support and a receptacle pivotally mounted thereon, of an arm operable to reverse said receptacle, a lug on said arm, and a pivoted latch coöperable with said lug to control the movement of said arm.

7. In a centrifugal machine, the combination with a rotatable support and a receptacle pivotally mounted thereon, of clutch elements normally in disengaged position, an arm connected with one of said clutch elements and with said receptacle, and means engaging said arm capable of controlling movement of one of said clutch elements.

8. The combination in a centrifugal machine including a shaft, a rotatable frame connected to said shaft and comprising a plate, and a reversible receptacle mounted on said frame, of mechanism whereby said receptacle is reversed, said mechanism comprising a stationary clutch member, a pinion located on said shaft and engageable with said clutch member, a gear mounted on said plate and meshing with said pinion, a pin on said gear, a slotted arm pivoted on said pinion and engaging said gear-pin, a circumferential ring movably mounted on said plate and connected with said arm, a crank connected with said receptacle and with said ring, and means coöperable with said slotted arm to control the movement thereof.

9. In a centrifugal machine, the combination with a shaft, a frame, and a reversible receptacle, of a clutch member loose on said shaft and secured against rotation, a pinion coöperating with means whereby said receptacle is reversed, and means operable to alter the relation of said pinion and clutch member to control the movement of said reversing means.

10. In a centrifugal machine, the combination with a shaft, a frame, and a reversible receptacle on said frame, of a clutch member loose on said shaft and secured against rotation, a pinion loose on said shaft and coöperating with means whereby said receptacle is reversed, means whereby said clutch member and pinion are maintained normally in disengaged position, and means operable to alter the relation of said pinion and clutch member to control the movement of said reversing means.

11. In a centrifugal machine, the combination with a shaft, a frame, and a reversible receptacle on said frame, of a clutch member loose on said shaft and secured against rotation, a pinion loose on said shaft and coöperating with means whereby said receptacle is reversed, a spring whereby said clutch member and pinion are maintained normally in disengaged position, and means operable to alter the relation of said pinion and clutch member to control movement of said reversing means.

12. In a centrifugal machine, the combination with a shaft, a frame, and a reversible receptacle on said frame, of a pinion on said shaft, a gear on said frame and in mesh with said pinion and coöperating with means whereby said receptacle is reversed, and means whereby rotation of said pinion is stopped and the reversing means operated as said gear revolves around said pinion.

13. In a centrifugal machine, the combination with a shaft, a frame, and a reversible receptacle on said frame, of a clutch member loose on said shaft and secured against rotation, a pinion loose on said shaft, a gear on said frame in mesh with said pinion and coöperating with means whereby said receptacle is reversed, and means operable to alter the relation of said pinion and clutch member to control the movement of said reversing means.

14. In a centrifugal machine, the combination with a shaft, a frame, and a reversible receptacle on said frame, of a clutch member on said shaft and secured against rotation, a pinion loose on said shaft, an arm connected with said receptacle, a gear on said frame in mesh with said pinion, an operative connection between said gear and arm, and means operable to alter the relation of said pinion and clutch member to control the movement of said reversing means.

15. In a centrifugal machine, the combination with a shaft, a frame, and a reversible receptacle on said frame, of a clutch member on said shaft and secured against rotation, a pinion loose on said shaft, an arm connected with said receptacle, a gear on said frame in mesh with said pinion, a pin on said gear and operable in a slot in said arm, and means operable to alter the relation of said pinion and clutch member to control the movement of said reversing means.

16. In a centrifugal machine, the combination with a shaft, a frame on said shaft, and a reversible receptacle on said frame, of a fixed clutch element, a pinion loose on said shaft, an arm connected with said pinion and with said receptacle, a gear on said frame and in mesh with said pinion, a connection between said gear and arm, and a latch in engagement with said arm and operable to alter the relation of said pinion and clutch element.

17. In a centrifugal machine, the combination of a shaft, a frame on said shaft, and a reversible receptacle on said frame, of a fixed clutch element, a pinion loose on said shaft, an arm connected with said pinion and with said receptacle, a gear on said frame and in mesh with said pinion, a connection between said gear and arm, a latch in engagement with said arm and operable to alter the relation of said pinion and clutch element, and a lug on said arm arranged to maintain said latch in predetermined positions.

18. In a centrifugal machine, the combination with a rotatable support and a reversible receptacle thereon, of a swinging arm coöperating to reverse said receptacle, a lug on said arm, a pivoted latch adjacent to said arm, an arm on said latch engaging said swinging arm whereby the latter is put into operation, and another arm on said latch coöperating with said lug for a purpose specified.

19. In a centrifugal machine, the combination with a rotatable support and a reversible receptacle thereon, of an arm coöperating to reverse said receptacle, a trip-latch on said rotatable support and engageable with said arm whereby the latter is thrown into operation, and an operating-latch comprising an annular portion arranged to engage said trip-latch.

20. In a centrifugal machine, the combination with a frame comprising a plate, and a reversible receptacle on said frame and connected with said plate, of a ring coöperating to reverse said receptacle, a bracket on said plate and supporting said ring, and a lug on said bracket and securing said ring in place.

21. A basket for honey-extractors comprising a frame, apertured steps in said frame, a side comprising members arranged to seat in said steps, and means whereby said side is normally held in closed position.

22. In a centrifugal machine including a receptacle, the combination with an arm connected with said receptacle and actuating means therefor, of a pivoted latch in engagement with said arm and capable of controlling the movement of the actuating mechanism.

23. The combination in the receptacle-reversing means of a honey-extractor including actuating mechanism and connected therewith a swinging arm having a lug thereon, of a pivoted latch comprising an arm in engagement with and arranged to move said swinging arm, and another arm in engagement with said lug.

24. The combination in the receptacle-reversing means of a honey-extractor including actuating mechanism and connected therewith a swinging arm having a lug on the end thereof, of a pivoted latch in engagement with a side of said lug at one position of said arm and in engagement with the end of said lug during movement of said arm.

25. The combination with the container of a honey-extractor having a lower bearing and an upper cross-bar having a bearing, of a shaft journaled in said bearings, a frame comprising a plate on said shaft, a reversible receptacle on said frame, a clutch-member attached to said cross-bar, a pinion adjacent to said clutch member and loose on said shaft, a swinging arm on said shaft and connected with said receptacle, a gear on said plate and in mesh with said pinion, a pin on said gear and in engagement with said arm, and a pivoted latch on said plate and coöperating with said arm for a purpose specified.

26. A honey-extractor comprising a container having a bar across its top, a shaft journaled in said bar, a frame comprising a plate on said shaft, a reversible receptacle on said frame, a slotted crank attached to said receptacle, a clutch member attached to said bar and forming a bearing for said shaft, a pinion on said shaft adjacent to said clutch member, an arm loosely pivoted on said pinion and having a slot therein, a pin on the free end of said arm and engaging the crank-slot, a gear on said plate, a pin on said gear and operable in said arm-slot, a spring normally separating said clutch member and pinion, and means arranged to cause the pinion and clutch member to engage.

In testimony whereof I affix my signature in presence of two witnesses.

JACOB F. KROPP.

Witnesses:
GEORGE J. KROPP,
O. H. HOPKINS.